United States Patent [19]
Braegas

[11] Patent Number: 5,465,088
[45] Date of Patent: Nov. 7, 1995

[54] RECEIVER FOR TRAFFIC MESSAGES

[75] Inventor: Peter Braegas, Hildesheim, Germany

[73] Assignee: Robert Bosch GmbH, Stuttgart, Germany

[21] Appl. No.: 150,001

[22] PCT Filed: Feb. 19, 1993

[86] PCT No.: PCT/DE93/00145

§ 371 Date: Nov. 12, 1993

§ 102(e) Date: Nov. 12, 1993

[87] PCT Pub. No.: WO93/18495

PCT Pub. Date: Sep. 16, 1993

[30] Foreign Application Priority Data

Mar. 13, 1992 [DE] Germany .......................... 42 08 277.3

[51] Int. Cl.$^6$ ............................. G08G 1/09; G06F 15/48
[52] U.S. Cl. ..................... 340/905; 340/990; 340/995; 364/437; 364/424.02; 455/54.2; 455/186.1
[58] Field of Search ...................... 340/905, 990, 340/995; 364/437, 424.01, 424.02; 455/54.2, 186.1

[56] References Cited

U.S. PATENT DOCUMENTS

| | | | |
|---|---|---|---|
| 5,020,143 | 5/1991 | Duckeck et al. | 340/905 |
| 5,173,691 | 12/1992 | Summer | 340/904 |
| 5,193,214 | 3/1993 | Matdus et al. | 340/905 |
| 5,257,023 | 10/1993 | Furuya | 340/905 |
| 5,313,200 | 5/1994 | Sone | 340/905 |

FOREIGN PATENT DOCUMENTS

| | | |
|---|---|---|
| 0369539 | 5/1990 | European Pat. Off. . |
| 0367935 | 5/1990 | European Pat. Off. . |
| 0384794 | 8/1990 | European Pat. Off. . |
| 3810180 | 5/1989 | Germany . |
| 8304029 | 2/1988 | WIPO . |

Primary Examiner—Donnie L. Crosland
Attorney, Agent, or Firm—Kenyon & Kenyon

[57] ABSTRACT

A traffic broadcast receiver with a first memory (16) for allocating received addresses to segments (S1–S40) of a street system, and with a device (30) for reproducing the received coded signals in clearly understandable form, is equipped with an additional device (42) with a second memory (44) for travel parameters of the segments (S1–S40) stored in the first memory (16), and addresses for segments adjacent to the respective segment (S1–S40), with an input device (34) for at least one destination input which is to be allocated to a stored segment (S1–S40), with a computer (46) to determine the optimum route to the destination (ZP), and with a third memory (48) in which the segments belonging to the optimum route determined by the computer (46) can be stored. In conjunction with the segments (S1–S40) stored in the first memory (16), the additional device allows the reproduction of an optimum route, determined by the computer (46), to the destination that was entered.

28 Claims, 5 Drawing Sheets

RECEIVER FOR TRAFFIC MESSAGES

The present invention concerns a traffic broadcast receiver with a first memory for allocating received addresses to segments of a street system, and with a device for reproducing the received coded signals in clearly understandable form.

Traffic broadcast receivers of this kind have been disclosed, for example, by German Patent Applications DE 38 10 179 A1 and DE 38 10 180 A1. These traffic broadcast receivers are suitable for receiving standardized coded traffic messages; the coded traffic message contains an address for a location, in particular a segment of a street system, to which the traffic message is applicable. Provided in the receiver is a first memory that contains a correlation between the coded address and the names of the segments, which are visually reproduced in clear text in a reproduction device. Further memories can be provided, with which addresses for data or events can be allocated to those data or events in a form reproducible in clear text.

German Patent Application DE 37 54 516 A1 further discloses a method for route-selective reproduction of traffic messages which makes it possible to output only those traffic messages that lie on a specific route of travel. The prerequisite for this is that the route of travel, with all its route sections, be entered into the corresponding unit. All segments of the route must therefore be previously known in enterable form. The operating complexity for this method is therefore considerable.

The underlying object of the present invention is to apply a traffic broadcast receiver of the aforesaid type for an additional purpose.

SUMMARY OF THE INVENTION

To achieve this object, a traffic broadcast receiver of the aforesaid type is provided with an additional device including a second memory for travel parameters of the segments stored in the first memory, and addresses for segments adjacent to the respective segment, an input device for at least one destination input which is to be allocated to a stored segment, a computer to determine the optimum route to the destination, and a third memory in which the segments belonging to the optimum route determined by the computer can be stored.

The present invention is based on the recognition that traffic broadcast receivers of the known type must necessarily contain a table of the segments of the street system, specifically in a form reproducible in clear text. With the additional device according to the present invention, additional information about the segments already stored in the traffic broadcast receiver is available for these segments, specifically at least one travel parameter for each segment and the linkage of the segments to one another. With this additional information the traffic broadcast receiver can be used for route finding, since the desired destination can be entered in a form that is to be allocated in the stored segment, and the additional unit has a computer that determines, from the available information about the linkage of the segments to one another, a route optimized with respect to the travel parameters that have been entered, in particular the length of the segments. One possible optimization algorithm is, for example, the Ford-Moore algorithm.

In a preferred embodiment, the additional device can be configured in the form of an IC card that can be inserted into and removed from the traffic broadcast receiver. In this form it is possible to reproduce the clear text for the segments in a language suitable for the user, even when a route system in a country with a different language is involved. With an IC card of this kind it is also possible to give the traffic broadcast receiver access to a route system that has not previously been stored in the traffic broadcast receiver, so that corresponding allocations of traffic messages to segments of that route system can be made.

Route finding with the traffic broadcast unit with additional device according to the present invention requires recognition of a starting point and entry of a destination. The starting point can, if applicable, be automatically determined by the traffic broadcast receiver from the table of receivable transmitters, if the traffic broadcast receiver decodes the identification data broadcast by the transmitters (RDS receiver). Alternatively, of course, it is possible to enter the starting point into the unit in a suitable manner, by directly entering the addresses of the starting segment and the destination segment. Generally, however, it will be advantageous to make it possible to enter the starting and destination locations with a usual entry, for example of the nearest large town, and to provide in the apparatus an allocation device that allocates the location to the applicable stored segment. The allocation device can take the form of a stored table in which respective associated segments are stored for potential starting and destination point entries.

If the starting location is detected by the traffic broadcast receiver by means of an automatic location determination system, this location information must also be allocated, by means of an allocation device, to a stored segment. In some cases it may be necessary in this context to select from two or more segments allocated to a location, for example on the basis of the approximate compass direction that leads to the destination. This takes into account the circumstance that different route segments can be allocated to one starting location, depending on the destination direction.

Based on the starting and destination segments known in the apparatus, the computer can determine an optimum route and store the segments comprising that route, in the correct order, in the third memory. Advantageously, at least the next best route is also stored in addition to the optimum route determined. In a preferred embodiment, the third memory (i.e., traveled) can be configured so that segments of the route that have just been completed (i.e., traveled) can be deleted from the memory.

The apparatus according to the present invention allows, with little required equipment, a route determination based on information about the starting point and destination. The driver therefore requires no knowledge about the segments leading from the starting point to the destination. Advantageously these segments can be communicated to the driver in the form of their addresses, or in an uncoded reproduction in a reproduction device, so that the driver can receive from the apparatus instructions about the segments to be traveled (for example "Autobahn A7 to the Kirchheim intersection"). It is advantageous in this context if the driver deletes from the memory segments that have already been completed (i.e., traveled), or if completed segments and deleted automatically by the unit's location function.

The optimum route can be determined using the criterion of shortest path length. However, since many route segments are high-stress, accident-prone segments, it may be advantageous to assign an evaluation factor to the length of the route segments when experience has indicated that the length of that particular segment requires greater travel time than the same length in a different segment. The optimum route can therefore be determined using the criterion of minimizing the total value of the products of the particular route length times the evaluation factor. This makes it possible to store the length of the particular segment, multiplied by the evaluation factor, in the third memory. It may be advantageous, however, to enter the evaluation or retrieve the evaluation from a fourth memory. In this context, multiple evaluation factors for each segment can be stored in the fourth memory as a function of typical situations such as travel time or date, weather, or the like. This embodiment of the apparatus is based on the recognition that the travel time for certain segments generally becomes longer only when a high volume of traffic is present, for example at the beginning or end of a holiday travel period, or when weather conditions are especially difficult.

The apparatus according to the present invention thus makes it possible to determine an optimum travel route with little required equipment (much less than required by a known navigation system).

The apparatus according to the present invention can be used to particular advantage in conjunction with a traffic broadcast receiver that has an additional receiver section for a separate traffic broadcast channel. This makes it possible to store in the receiver the received traffic messages that apply to the segments stored in the third memory, and to have them switched through to a reproduction device by gate circuit shortly before the applicable segment is entered.

The traffic messages received in standardized form can advantageously be processed in the computer to check the optimum route that has been determined. This can be done, for example, by allowing the evaluation factor for the applicable route segment to be modified by the traffic message received in standardized form.

The apparatus for route determination according to the present invention therefore permits, in conjunction with modern traffic broadcast receivers, a multiplicity of applications that can be achieved with little required equipment.

BRIEF DESCRIPTION OF THE DRAWINGS

The present invention will be explained in greater detail below with reference to an exemplary embodiment depicted in the drawings with.

DETAILED DESCRIPTION

Figure 1A:
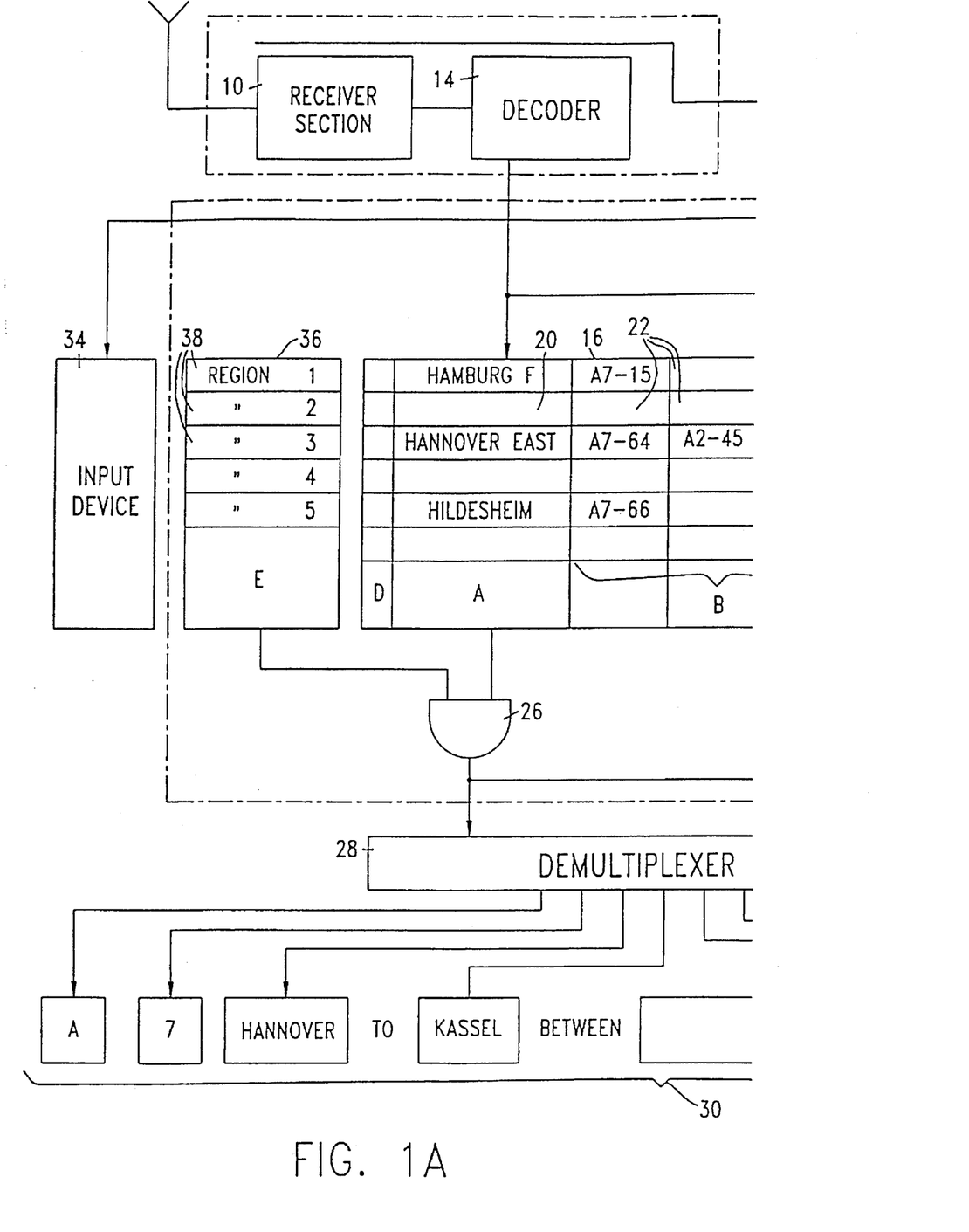
FIG. 1 is a schematic diagram of a traffic broadcast receiver with an additional device according to the present invention.
Figure 1B:
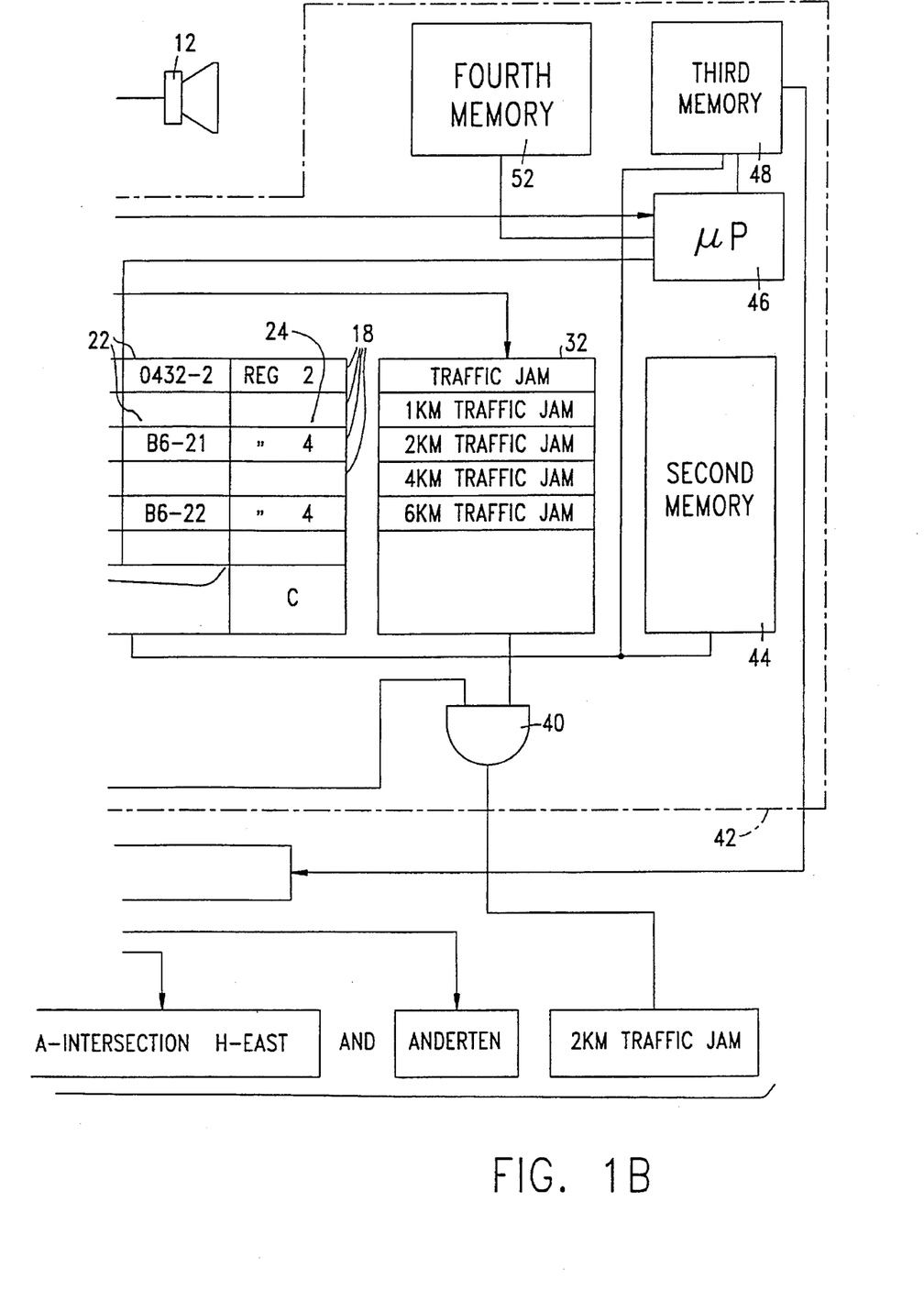

FIG. 1 shows a traffic broadcast receiver with a receiver section 10, the output of which for standard broadcast signals is connected to a loudspeaker 12. Connected to receiver section 10 is a decoder 14 that is used to decode digitally coded received traffic messages. Decoder 14 is connected to a memory device 16 via an address line. Memory device 16 contains memory fields 18, selectable by means of addresses, which contain memory locations 20, 22, and 24.

The output of memory device 16 leads via a logic element 26 to a demultiplexer 28 that branches to a reproduction device 30, here in the form of an optical output device.

Also provided in addition to first memory 16—which contains information about segments of the route system which can be retrieved via addresses that are received and then decoded with the aid of decoder 14—is an event memory 32 whose address inputs are also activated by decoder 14, and whose output leads to a further field of the reproduction device 30.

Route-specific features can be limited by means of an input device 34. Downstream from this input device 34 is a memory 36, the output of which leads to a further input of logic element 26.

First memory 16 is organized so that memory fields 18 are addressed via addresses d. Addressing occurs here via data that leave decoder 14.

Memory fields 18 are divided into memory locations 20 for place names a; memory locations 22 for other route-specific features b such as Autobahns (limited-access highways) or major highways with exit numbers; and memory locations 24 with region identifiers c.

Memory device 36 is similarly organized, but has less memory capacity. In addition to the ability to select route-specific features such as Autobahn segments (which are not depicted), memory device 36 has memory locations 38 with region identifiers e.

By actuating input device 34 it is possible to select, for example, a region e. The data selected are then compared with the data for region c from first memory 16, and are conveyed to demultiplexer 28 via logic element 26 only if they are identical.

At the same time, the event retrieved from event memory 32 is released, and conveyed via logic element 40 to output device 30.

The conventional traffic broadcast receiver described so far has an additional device 42 in the form of an IC card that preferably also comprises memories 16, 32, 36. This additional device contains a second memory 44, a computer 46, and a third memory 48. Input device 34 is also connected to computer 46.

Second memory 44 contains information about linkage to the segments of the route system already stored in first memory 16, as well as the length of the respective segments (which represents the simplest travel parameter). Linkage of the segments is explained in even further detail with reference to FIG. 2.

Second memory 44 of additional device 42 is connected to first memory 16 of the traffic broadcast receiver, and thus requires only the addresses of the segments of the route system, since the allocation of addresses to segments is contained in first memory 16.

Connected to second memory 44 is a computer 46 that, once a destination and optionally a starting point have been entered, uses the Ford-Moore algorithm, for example, to determine an optimum route and stores the resulting optimum route in a third memory 48.

The optimum route determined in this manner can be conveyed from third memory 48 to the reproduction device 30 via demultiplexer 28, which preferably can also consist of a speech synthesizer and a loudspeaker, so that the traffic messages and the determined route can be reproduced audibly as normal speech.

The destination and starting point can be entered with input apparatus 34. With the information stored in first memory 16, the location data, which possibly may not have been entered in the form of segment addresses, can be allocated to a segment stored in second memory 44, as will be explained further with reference to FIG. 4.

Also connected to computer 46 is a fourth memory 52, which optionally contains a plurality of retrievable evaluation factors for the segments stored in second memory 44.

Figure 2:
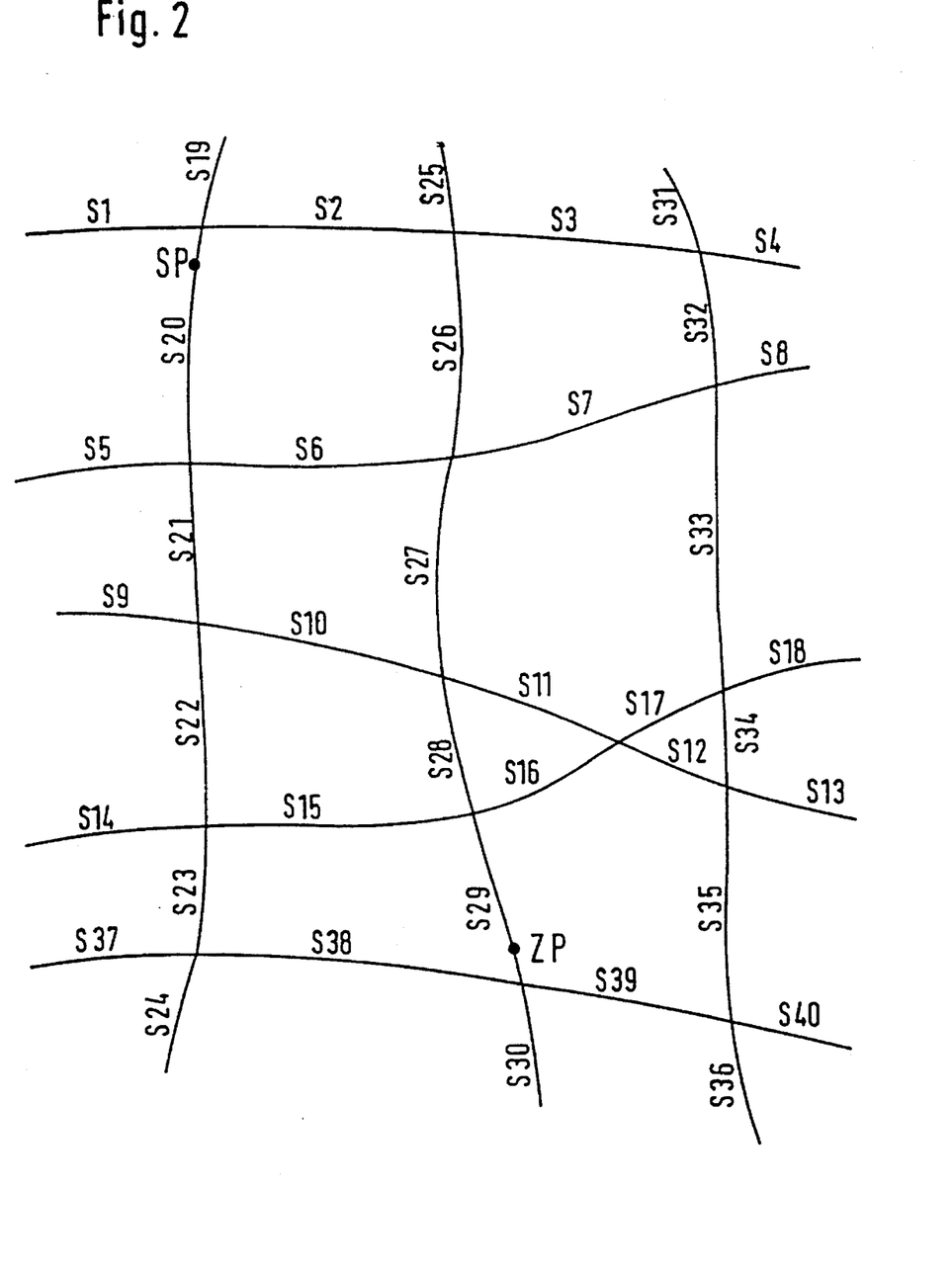
FIG. 2 illustrates an exemplary graphic depiction of a route system for which at least one travel parameter for each segment, and the linkage of the segments to one another, can be stored in a second memory of an additional device.

FIG. 2 shows an example of a route system including forty segments S1 to S40 which are stored in second memory 44 for route determination, specifically with their addresses S1 to S40 (for example their respective lengths as the travel parameter) and with the addresses of adjacent segments. For example, segment S20 in the exemplary embodiment depicted, is connected at one end to segments S1, S19, and S2, and at the other end to segments S5, S6, and S21. This information is stored in second memory 44. If starting point SP of a journey (located for example on segment S20) and a destination ZP for the planned journey (located on segment S29 in the exemplary embodiment depicted) are known, computer 46 can then use the stored data, applying for example the Ford-Moore algorithm, to determine the shortest path from starting point SP to destination ZP. In the exemplary embodiment depicted, the shortest path would consist of segments S20, S21, S10, S28, and S29. The second-shortest path, on the other hand, would consist of segments S20, S6, S27, S28, and S29.

The two determined paths are stored in third memory 48 of the apparatus in such a way that once a path segment has been completed (i.e., traveled), it can be deleted from third memory 48. For example once segment S21 is entered, traveled on segment S20 has been completed and S20 can be deleted, In combination with a traffic broadcast receiver, the apparatus according to the present invention is advantageously utilized to switch through to reproduction device 30, only those traffic messages that are relevant to the segments stored in third memory 48, i.e. to the planned route of travel and the at least one alternate route. It is immediately evident that all logical linkages, including those performed by logic elements 26, 40, can be implemented by the software of a microprocessor, possibly that of computer 46.

Figure 3:
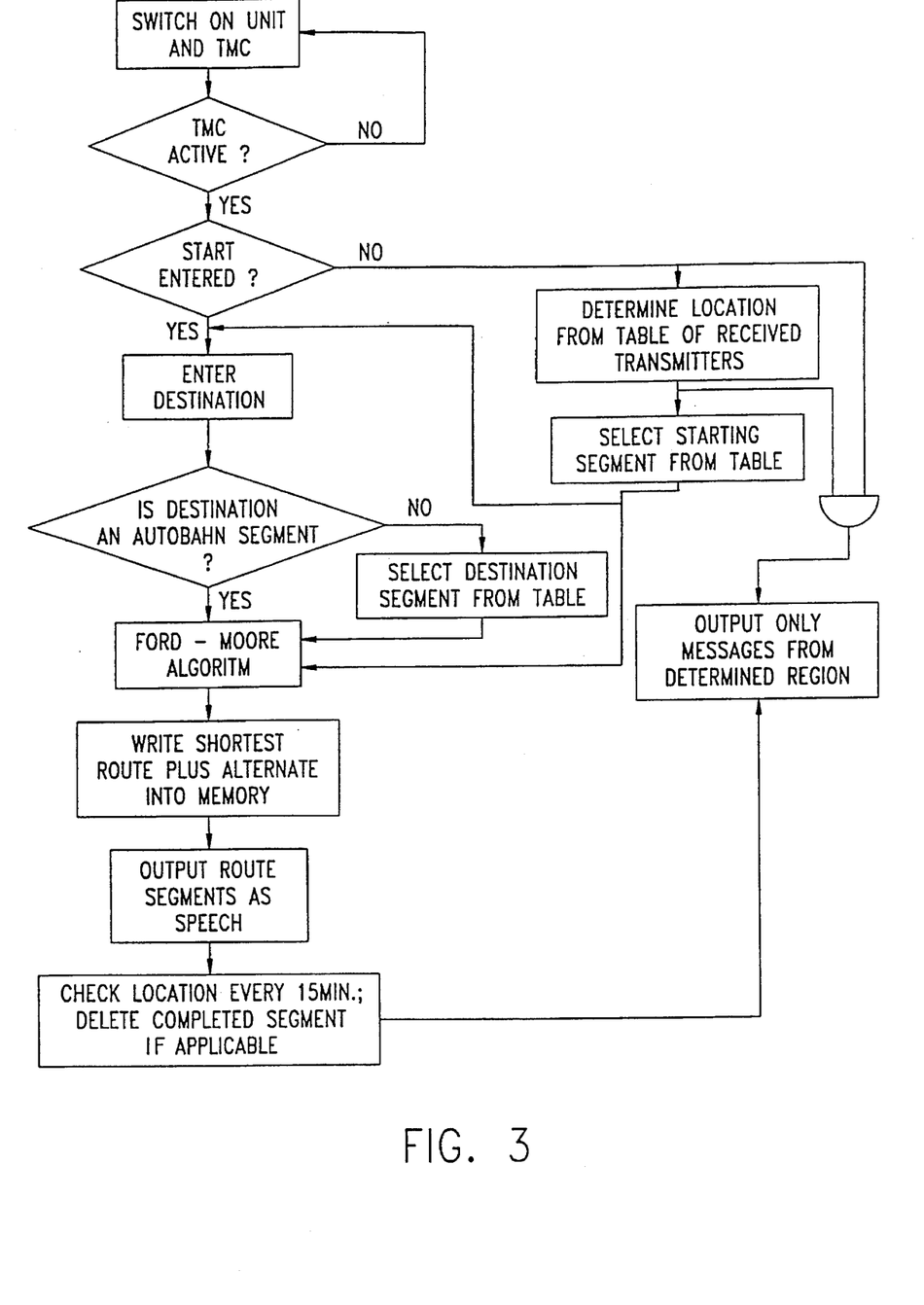
FIG. 3 is a flow chart explaining the operation of the apparatus according to the present invention.

The operation of an apparatus according to the present invention can be selected as depicted as an exemplary embodiment in the flow diagram in FIG. 3.

After the unit is switched on, in this case, the separate traffic broadcast channel of the unit is activated.

The unit then determines whether the route starting point SP has been entered. If so, the route destination ZP must be entered. Starting point SP and destination ZP can be entered by entering the segments on which the starting point and ending point lie as stored in the second memory. Otherwise, the associated segment can be retrieved from a table ("lookup table") of first memory 16 and entered automatically or manually.

If the starting point has not been entered, the apparatus together with an RDS receiver can determine its approximate location by itself, by drawing conclusions as to its location from the table of transmitters that can be received at that location. The unit can select the starting segment associated with the determined starting point. Once the starting segment and destination segment corresponding to the segments stored in the second memory are available, the apparatus can use the Ford-Moore algorithm to determine the shortest route and at least one alternate route, and write them into third memory 48. Advantageously the Autobahn segments applicable to the determined route can be output to the driver (in clear text if possible) with an output apparatus, for example a speech synthesizer.

The unit can then use the particular transmitters being received to determine its location again (for example every 15 minutes) and delete completed (i.e., traveled) segments from the second memory. As a result, it is possible to discontinue the output of traffic messages which apply to completed segments.

The apparatus according to the invention thus uses simple physical means to permit a considerable simplification in operation, since the driver no longer needs to know which segments will actually be traversed.

Advantageously, in a first implementation phase essentially only the German Autobahn system (BAB) with its segments will be stored in the second memory. Optionally, in a later implementation phase the most important long-distance routes and, especially, alternate routes for Autobahn segments, can also be stored.

Figure 4:
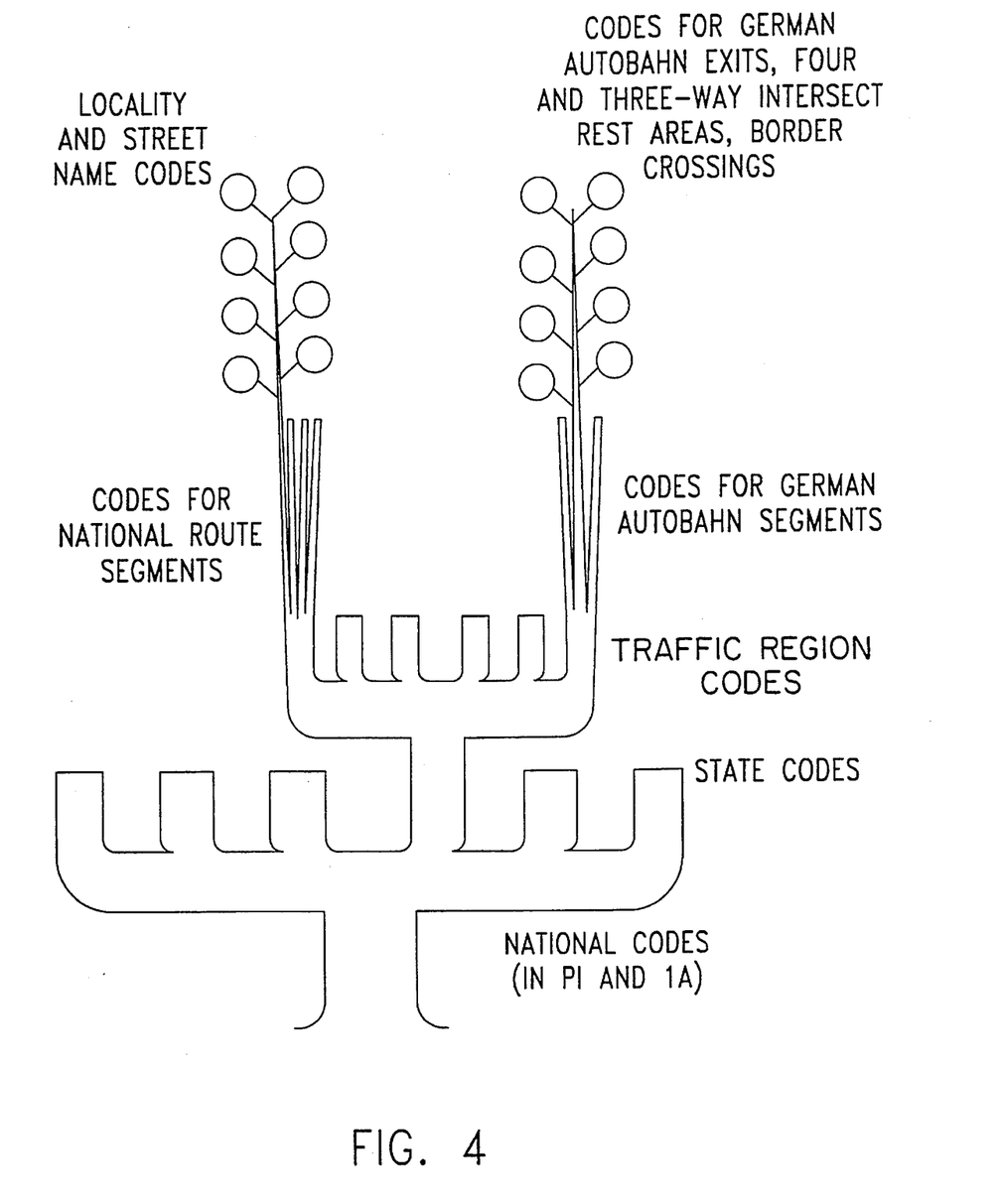
FIG. 4 schematically depicts the structure of a location code.

FIG. 4 illustrates the structure of a location code transmitted along with traffic messages, which is hierarchically structured. An initial distinction is made using country codes. A further distinction is made, for example for Germany, with the 16 German state codes. For each state a plurality of traffic region codes are provided, to which in turn a plurality of German Autobahn segments codes then belong. For each German Autobahn segment there are a plurality of codes for Autobahn exits, four- and three-way Autobahn intersections, rest areas, border crossings, and the like.

Bases on this code, first memory 16 contains allocations of addresses to clear-text data. In this memory it is therefore possible, for example, to allocate an Autobahn exit to an Autobahn segment.

What is claimed is:

1. A traffic broadcast receiver comprising:
   a) a first memory for allocating received addresses to segments of a street system;
   b) a device for reproducing received coded signals in clearly understandable form; and
   c) an additional device, said additional device including
      i) a second memory for storing travel parameters of the segments stored in the first memory and addresses allocated to the segments,
      ii) an input device for permitting the supply of at least one destination input which is to be allocated to a stored segment,
      iii) a computer adapted to determine the optimum route to the destination, and
      iv) a third memory in which segments forming the optimum route determined by the computer can be stored.

2. The receiver of claim 1 wherein segments over which travel has been completed are deleted from the third memory.

3. The receiver of claim 1 wherein the third memory is adapted to store segments for a second-best route in addition to the segments for the optimum route.

4. The receiver of claim 1 wherein each of the segments has a length, the second memory is adapted to store the lengths of the respective segments as the travel parameter, and the optimum route determined by the computer includes segments having the shortest sum of segment lengths.

5. The receiver of claim 1 wherein each segment stored in the second memory has an associated evaluation factor, and the optimum route determined by the computer includes segments having the minimum summed products of the respective segment length times an evaluation factor.

6. The receiver of claim 5 wherein the second memory is adapted to store the lengths of the segments multiplied by their associated evaluation factor.

7. The receiver of claim 7 further comprising a fourth memory adapted to store the evaluation factors such that the evaluation factors can be read from, and written to, the fourth memory.

8. The receiver of claim 7 wherein said fourth memory stores at least two evaluation factors for at least one of the segments, the evaluation factors being a function of at least one of travel time, date, and weather.

9. The receiver of claim 1 further comprising a gate circuit adapted to pass through to the reproduction device only those traffic messages which apply to segments stored in the third memory.

10. The receiver of claim 1 wherein tile traffic broadcast receiver recognizes identification signals of broadcast transmitters and further comprises an analysis device adapted to determine an approximate location of a vehicle from particular broadcast transmitters being received.

11. The receiver of claim 10 further comprising a device adapted to allocate the location determined by the analysis device to a segment stored in the first memory.

12. The receiver of claim 1 further comprising an allocation device adapted to allocate the input of the destination to a stored segment.

13. The receiver of claim 12 wherein tile allocation device comprises a stored table in which a respective associated segment is stored for a potential starting point and destination inputs.

14. The receiver of claim 1 further comprising a receiver for a separate traffic message channel.

15. The receiver of claim 9 wherein the receiver stores the received traffic messages which apply to the segments stored in the third memory and the gate circuit passes the received traffic messages through to the reproduction device shortly before the applicable segment is entered.

16. The receiver of claim 1 wherein the computing device is adapted to process traffic messages received in standardized form to check the optimum route that has been determined.

17. The receiver of claim 16 wherein tile evaluation factor for the applicable route segment can be modified by the traffic message received in standardized form.

18. The receiver of claim 1 wherein the additional device is implemented in the form of an IC card that can be inserted into and removed from the traffic broadcast receiver.

19. The receiver of claim 18 wherein the IC card also comprises the first memory.

20. The receiver of claim 1 wherein the reproduction device is adapted to output the segments belonging to the optimum route determined.

21. The receiver of claim 21 wherein the reproduction device is an audible reproduction device formed as a speech synthesizer.

22. In a traffic broadcast receiver including
a station receiver,
a decoder,
a first memory including a plurality of addresses and associated segments, the segments defining a road system,
a memory device,
a computer,
an event memory,
a second memory storing all links between segments stored in the first memory and storing length corresponding to each of the segments stored in the first memory,
a third memory,
a fourth memory storing travel parameter evaluation factors corresponding to each of the segments stored in the first memory,
an input device, and
an output device,
a method for providing a route to a driver, comprising the steps of:
a) determining a starting point;
b) determining a first segment upon which the starting point lies based on the segments stored in the first memory;
c) entering a destination point via the input device;
d) determining a second segment upon which the destination point lies based on the segments stored in the first memory;
e) computing an optimum route between the first segment associated with the starting point and the second segment associated with the destination point;
f) writing the optimum route computed in step (e) to the third memory; and
g) outputting the optimum route to a driver via the output device.

23. The method of claim 22 further comprising tile step of:
h) deleting any segments defining the optimum route calculated that have already been traveled.

24. The method of claim 22 wherein the step of determining a starting point comprises the sub-step of inputting a starting point via the input device.

25. The method of claim 22 wherein the step of determining a starting point comprises the sub-step of determining an approximate location based on stations received by the station receiver.

26. The method of claim 22 wherein tile step of computing an optimum route uses the Ford-Moore algorithm.

27. The method of claim 22 wherein tile optimum route computed in step (e) is defined by the minimum sum of lengths of segments defining the route.

28. The method of claim 22 wherein the optimum route computed in step (e) is defined by the minimum sum of the product of the lengths and evaluation factors of the segments defining the route.

* * * * *

UNITED STATES PATENT AND TRADEMARK OFFICE
CERTIFICATE OF CORRECTION

PATENT No. : 5,465,088

DATED : November 7, 1995

INVENTOR(S): Peter Braegas

It is certified that error appears in the above-identified patent and that said Letters Patent is hereby corrected as shown below:

Column 2, line 58, after "segments" delete "and" and insert --are--;

Column 3, line 42, after "drawings" delete "with";

Column 7, line 4, "claim 7" should be --claim 5--;

Column 7, lines 16, 27, 42, delete "tile" and insert --the--;

Column 7, line 53, "claim 21" should be --claim 1--; and

Column 8, lines 37, 48, 50, "tile" should be --the--.

Signed and Sealed this

Twenty-seventh Day of August, 1996

Attest:

BRUCE LEHMAN

*Attesting Officer*   *Commissioner of Patents and Trademarks*